(12) United States Patent
Hagiwara et al.

(10) Patent No.: US 11,030,407 B2
(45) Date of Patent: Jun. 8, 2021

(54) COMPUTER SYSTEM, METHOD AND PROGRAM FOR PERFORMING MULTILINGUAL NAMED ENTITY RECOGNITION MODEL TRANSFER

(71) Applicant: Rakuten, Inc., Tokyo (JP)

(72) Inventors: Masato Hagiwara, Tokyo (JP); Ayah Zirikly, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 16/073,611

(22) PCT Filed: Jun. 22, 2016

(86) PCT No.: PCT/JP2016/068565
§ 371 (c)(1),
(2) Date: Jul. 27, 2018

(87) PCT Pub. No.: WO2017/130434
PCT Pub. Date: Aug. 3, 2017

(65) Prior Publication Data
US 2019/0034407 A1    Jan. 31, 2019

Related U.S. Application Data

(60) Provisional application No. 62/288,109, filed on Jan. 28, 2016.

(51) Int. Cl.
*G06F 40/295* (2020.01)
*G06K 9/72* (2006.01)
(Continued)

(52) U.S. Cl.
CPC ............ *G06F 40/295* (2020.01); *G06F 40/58* (2020.01); *G06K 9/6215* (2013.01);
(Continued)

(58) Field of Classification Search
CPC ..... G06F 17/278; G06F 17/289; G06K 9/723; G06K 9/6297; G06K 9/6215; G06K 9/6218
(Continued)

(56) References Cited

U.S. PATENT DOCUMENTS 10,268,684 B1\* 4/2019 Denkowski ............. G06F 40/58
2005/0182630 A1\* 8/2005 Miro ....................... G10L 13/08
704/269
(Continued)

OTHER PUBLICATIONS

P. Fung and T. Schultz, "Multilingual spoken language processing," in IEEE Signal Processing Magazine, vol. 25, No. 3, pp. 89-97, May 2008, doi: 10.1109/MSP.2008.918417. (Year: 2008).\*
(Continued)

*Primary Examiner* — Bharatkumar S Shah
(74) *Attorney, Agent, or Firm* — Troutman Pepper Hamilton Sanders LLP

(57) ABSTRACT

A multilingual named-entity recognition system according to an embodiment includes an acquisition unit configured to acquire an annotated sample of a source language and a sample of a target language, a first generation unit configured to generate an annotated named-entity recognition model of the source language by applying Conditional Random Field sequence labeling to the annotated sample of the source language and obtaining an optimum weight for each annotated named entity of the source language, a calculation unit configured to calculate similarity between the annotated sample of the source language and the sample of the target language, and a second generation unit configured to generate a named-entity recognition model of the target language based on the annotated named-entity recognition model of the source language and the similarity.

5 Claims, 16 Drawing Sheets

(51) Int. Cl.
    *G06K 9/62* (2006.01)
    *G06F 40/58* (2020.01)
(52) U.S. Cl.
    CPC ......... *G06K 9/6218* (2013.01); *G06K 9/6297* (2013.01); *G06K 9/723* (2013.01)
(58) Field of Classification Search
    USPC .......................................................... 704/9
    See application file for complete search history.

(56) References Cited

U.S. PATENT DOCUMENTS

| | | | | |
|---|---|---|---|---|
| 2006/0047500 | A1* | 3/2006 | Humphreys | G06F 40/295 704/9 |
| 2006/0085190 | A1* | 4/2006 | Gunawardana | G10L 15/14 704/256.3 |
| 2009/0319257 | A1* | 12/2009 | Blume | G06F 40/58 704/7 |
| 2016/0092438 | A1* | 3/2016 | Sonoo | G06F 40/268 704/2 |
| 2018/0203851 | A1* | 7/2018 | Wu | G06N 3/006 |

OTHER PUBLICATIONS

"Inducing multilingual text analysis tools via robust projection across aligned corpora", David Yarowsky, Grace Ngai, and Richard Wicentowski, Proceedings of the First International Conference on Human Language Technology Research, HLT '01, Mar. 18-21, 2001, p. 1-p. 8.

"Unsupervised part-of-speech tagging with bilingual graph-based projections", Dipanjan Das and Slav Petrov, Proceedings of the 49th Annual Meeting of the Association for Computational Linguistics: Human Language Technologies, 2011, p. 600-p. 609.

"Cross-lingual projected expectation regularization for weakly supervised learning", Mengqiu Wang and Christopher D Manning, 2014.

"A survey on transfer learning", Sinno Jialin Pan and Qiang Yang, IEEE Trans. on Knowl. and Data Eng., 22(10), Oct. 2010, p. 1345-p. 1359.

"Cross-language parser adaptation between related languages", Daniel Zeman, Univerzita Karlova, and Philip Resnik, In IJCNLP-08 Workshop on NLP for Less Privileged Languages, 2008, p. 35-p. 42.

"Multi-source transfer of delexicalized dependency parsers", Ryan McDonald, Slav Petrov, and Keith Hall, Proceedings of the Conference on Empirical Methods in Natural Language Processing, EMNLP '11, 2011, p. 62-p. 72.

"Synergy: A named entity recognition system for resource-scarce languages such as swahili using online machine translation", Rushin Shah, Bo Lin, Anatole Gershman, and Robert Frederking, Proceedings of the Second Workshop on African Language Technology (AfLaT 2010), 2010, p. 21-p. 26.

"A universal part-of-speech tagset", Slav Petrov, Dipanjan Das, and Ryan McDonald, arXiv preprint arXiv: 1104.2086, 2011.

"Classbased n-gram models of natural language", Peter F Brown, Peter V Desouza, Robert L Mercer, Vincent J Della Pietra, and Jenifer C Lai, Computational linguistics, 18(4), 1992, p. 467-p. 479.

"BabelNet: The automatic construction, evaluation and application of a wide-coverage multilingual semantic network", Roberto Navigli and Simone Paolo Ponzetto, Artificial Intelligence, 193, 2012, p. 217-p. 250.

"Semi-supervised learning using gaussian fields and harmonic functions", Xiaojin Zhu, Zoubin Ghahramani, and John Lafferty, in ICML, 2003, p. 912-p. 919.

"The Stanford CoreNLP natural language processing toolkit", Christopher D. Manning, Mihai Surdeanu, John Bauer, Jenny Finkel, Steven J. Bethard, and David McClosky, Proceedings of 52nd Annual Meeting of the Association for Computational Linguistics: System Demonstrations, 2014, p. 55-p. 60.

"Probabilistic part-of-speech tagging using decision trees", Helmut Schmid, 1994.

International Preliminary Report on Patentability for International Application No. PCT/JP2016/068565 dated Aug. 9, 2018.

* cited by examiner

COMPUTER SYSTEM, METHOD AND PROGRAM FOR PERFORMING MULTILINGUAL NAMED ENTITY RECOGNITION MODEL TRANSFER

CROSS-REFERENCE TO RELATED APPLICATIONS

This is a U.S. national phase application under 35 U.S.C. § 371 of International Patent Application No. PCT/JP2016/068565, filed Jun. 22, 2016, and claims benefit of priority to U.S. Provisional Application No. 62/288,109, filed Jan. 28, 2016. The entire contents of these applications are hereby incorporated by reference.

TECHNICAL FIELD

The present application relates to a method for performing a multilingual Named Entity Recognition model transfer and a computer-readable program for performing the method.

BACKGROUND

Named Entity Recognition ("NER") is a subfield of information extraction which has been actively studied in past decades. "Named entities" are text strings, usually words or short phrases, that identify particular characteristics of something. For example, named entities can be proper nouns, such as the names of people, places, or businesses. Named entities frequently serve to identify a particular thing, especially in combination. For example "Cairo" could be the proper name of a town, but that town could be, for example, Cairo, Egypt, Cairo, Ill. (United States), or Cairo, Ga. (United States). The additional named entities of "Egypt," "Illinois," "Georgia," and "United States" provide further clarification as to which "Cairo" is meant.

Automated recognition of named entities within larger strings of text has many practical applications. For example, an itinerary for someone traveling from Cairo, Ill., United States to Cairo, Egypt might be a text string thousands of characters long with hundreds or thousands of words. Automated recognition of the named entities "Cairo, Ill., United States," "Cairo, Egypt," and any intervening stops might allow a computer to recognize the text as a travel itinerary without any human assistance.

NER has particular application in the fields of online search and online shopping. By properly recognizing named entities within text strings, searches and transactions can become faster and more efficient. For example, an online shopper may search for a "small white blouse." Searching every text string within the shopping database for these terms is very computationally demanding. By properly identifying "small," "white," and "blouse" as named entities, both within the search and the database entries, the search becomes faster and more efficient because only named entities are searched, rather than all of the text in the database. Further improvements can be achieved by properly placing the search terms within categories of named entities, for example "size," "color," and "type." Such classification further reduces the number and size of the text strings that must be searched. Such classification also facilitates faceted search. Faceted search allows a user to narrow the scope of a search by applying multiple filters. In this case, properly identified named entities may serve as values for various filters. For example, a user may search for "blouse" and then filter results so that "color"="white."

NER is usually solved by a supervised learning approach, where sequential labeling models are trained from a large amount of manually annotated corpora. However, such rich annotated data only exist for well-documented, resource-rich languages such as English, Chinese, and Arabic. Building NER systems for the majority of less-documented, resource-poor languages in the world, or specific domains in any languages, still poses a great challenge. In this sense a domain is an application of the technique or a type of use or a field of use for the technique. Annotation projection through parallel text has been traditionally used in order to overcome this issue, where the annotated tags in the source (resource-rich) language are projected via word-aligned bilingual parallel text (bitext) and used to train sequential labeling models in the (resource-poor) target language. See, for example, Yarowsky et al., 2001 (NPL1), Das and Petrov, 2011 (NPL2), and Wang and Manning, 2014 (NPL3), which are incorporated by reference in their entirety. However, this approach can lead to word alignment and projected tags being less consistent than desirable (i.e. "noisy"), making the trained models sub-optimal. The availability of such bitext is also limited especially for resource-poor languages and domains where it is often the case that the only available resources are moderately-sized monolingual/comparable text samples (i.e. "corpora") and small bilingual dictionaries.

In order to overcome such issues, direct transfer approaches to cross-lingual NER model, which are also classified as transductive transfer learning and closely related to domain adaptation, have been developed. See, for example, Pan and Yang, 2010 (NPL4), which is incorporated by reference in its entirety. In the direct transfer approaches, a constituent (i.e. grammar-based) parser is built using direct transfer between closely related languages, namely, Danish and Swedish. See, for example, Zeman et al., 2008 (NPL5), which is incorporated by reference in its entirety. Also in, for example, McDonald et al., 2011 (NPL6), which is incorporated by reference in its entirety, delexicalized (i.e. not specific word-dependent) dependency parsers are trained in English and then "re-lexicalized" the parser.

However, transfer of NER taggers poses a difficult challenge different from syntax transfer: most of past work deals with de-lexicalized parsers, yet one of the most important clues for NER, gazeteers, is inherently lexicalized, i.e. the specific words inherently matter, rather merely the type of words. Also, various features used for dependency parsing (Universal POS tags, unsupervised clustering, etc.) are not proven useful for direct transfer of NER model. A strong machine-translation baseline is described in, for example, Shah et al., 2010 (NPL7), where a system output in a source language is simply machine translated into the target language.

SUMMARY

Transferring a Named Entity Recognition (NER) model from a first language to second language is difficult if the second language lacks well-documented named-entity data from which to generate associations between named-entity types in the first and second language.

An aspect of the present application is to provide methods for multilingual NER model transfers, which overcomes the above-discussed challenge and performs the multilingual NER model transfers significantly more effectively when compared to a conventional strong machine-translation baseline.

Two improved means are taught to solve the problem of transferring a Named Entity Recognition (NER) model from a first language to second language. The first means employs applying Conditional Random Field (CRF) sequence labeling to a plurality of multilingual features and mapping CRF features generated in the first language to the second language using the novel technique of Brown clustering mapping. The second means employs applying Conditional Random Field (CRF) sequence labeling to a plurality of multilingual features and mapping CRF features generated in the first language to the second language using the novel technique of gazetteer expansion. Brown clustering mapping and gazetteer expansion may also be employed in combination.

In order to achieve the above-noted aspect, the present application provides methods including various non-lexical features such as Universal POS tags, Brown cluster mapping, position features, for effective multilingual NER model transfers.

Another aspect of the present application is to provide methods for multilingual NER model transfers, including features relating to a gazetteer expansion technique through which gazetteers in the target language are generated from the source language gazetteers and a comparable corpus.

Yet another aspect of the present application is to provide methods for multilingual NER model transfers, which performs the multilingual NER model transfer effectively, based on inter-language orthographic similarity.

According to one aspect of the present application, efficient multilingual NER model transfers are achieved.

DETAILED DESCRIPTION

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is directed to improving NER by providing novel means to apply an NER model in a well-modeled language directly to a poorly-modeled or un-modeled language. The basic process develops a language-neutral NER model in a source language using Conditional Random Field (CRF) sequence labeling. CRF modeling takes a number of monolingual features as inputs, optimizes the weights of each, and returns a model for NER in the source language. The model is then translated into the target language using the novel techniques of Brown Clustering Mapping and/or Gazetteer Expansion.

Figure 1:
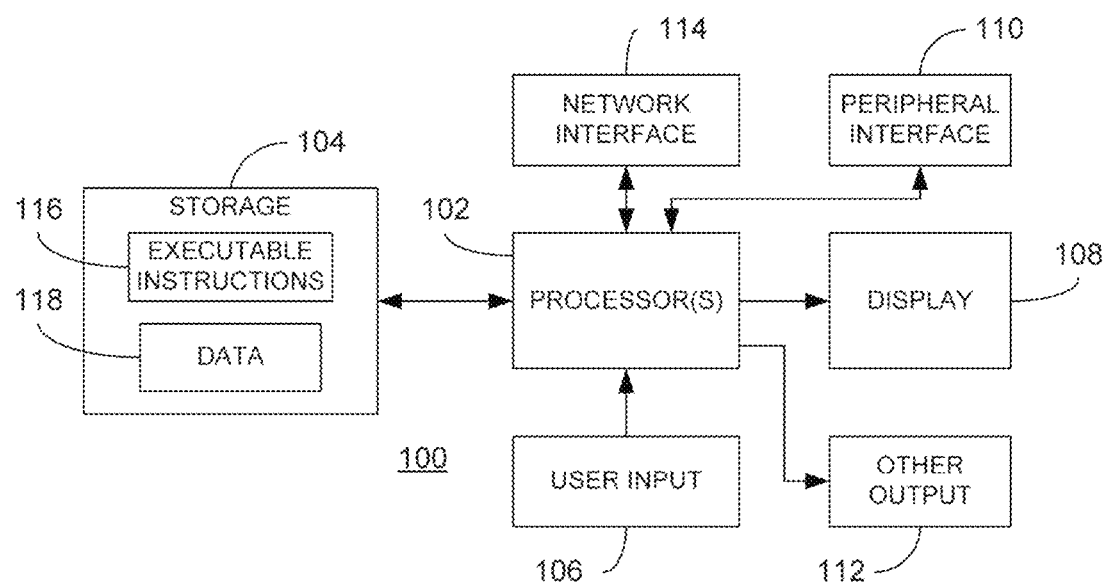
FIG. 1 is a block diagram of computer system illustrating the relationship between certain components that may be included in the system, in accordance with the present disclosure.

Referring now to the Figures, in which like reference numerals represent like parts, various embodiments of the computing devices and methods will be disclosed in detail. FIG. 1 is a block diagram illustrating one example of a computing device 100 suitable for use in generating visualizing integrated real estate data.

FIG. 1 illustrates a representative computing device 100 that may be used to implement the teachings of the instant disclosure. The device 100 may be used to implement, for example, one or more components of the system shown in FIG. 4, as described in greater detail below. As another example, the device 100 may be used to implement the methods of FIG. 2 or FIG. 3, as described in greater detail below. The device 100 includes one or more processors 102 operatively connected to a storage component 104. The storage component 104, in turn, includes stored executable instructions 116 and data 118. In an embodiment, the processor(s) 102 may include one or more of a microprocessor, microcontroller, digital signal processor, co-processor or the like or combinations thereof capable of executing the stored instructions 116 and operating upon the stored data 118.

Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy (registered trademark) disc drive, flash memory, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the processor(s) 102. The user input device 106 may include any mechanism for providing user input to the processor(s) 102. For example, the user input device 106 may include a keyboard, a mouse, a touch screen, microphone and suitable voice recognition application, or any other means whereby a user of the device 100 may provide input data to the processor(s) 102. The display 108 may include any conventional display mechanism such as a cathode ray tube (CRT), flat panel display, projector, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk, solid state, or optical disk drives), other processing devices, or any other input source used in connection with the instant techniques. For example, the peripheral interface may be a Universal Serial Bus (USB). Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Named Entity Recognition in the Source Language

Figure 2:
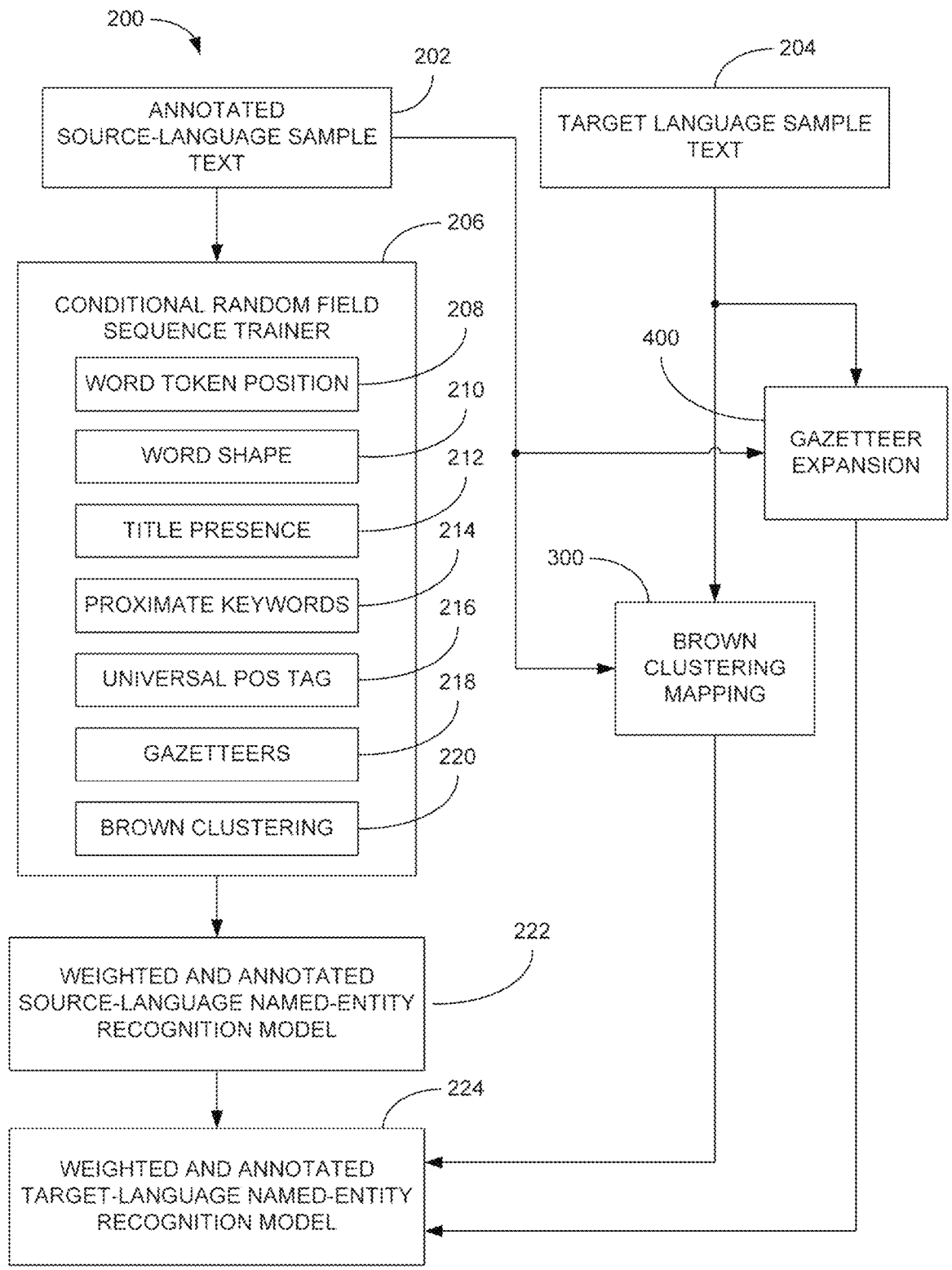
FIG. 2 is a block diagram of information elements used in CRF mapping and illustrating the informational inputs, intermediary information, and informational outputs, in accordance with the present disclosure.

FIG. 2 illustrates a block diagram of information elements used in CRF mapping and illustrating the informational inputs, intermediary information, and informational outputs. The process begins with an annotated sample of text from a source language 202 and a sample of text from a target language 204. Named entities within the annotated sample of text from a source language 202 are tagged with their named entity class, e.g., brand name, size, color, type, etc. The remainder of the words within the annotated sample of text from a source language 202 are un-tagged or tagged in a way that indicates they are not named entities.

The annotated sample of text from the source language 202 is entered into to a CRF sequence trainer 206. The CRF sequence trainer 206 uses a plurality of monolingual features to train the NER system based on the annotated sample of text from a source language 202. During training the system generates iterative NER models seeking to optimize the class probabilities (i.e. edge weights) and word probabilities (i.e. emission weights) for each tagged named entity within the annotated sample of text from a source language 202. In this type of model, the proper class of a particular word is known within the annotated sample, but unknown in future samples to be classified. Within the field of the disclosure, the class for a word may more generally be referred to as its state, category, or cluster. The class probability may be referred to as a transition probability (i.e. transition between states) or as an edge weight. Therefore, the class probability is the probability of the next word in sequence belonging to a particular class. For example, if word n is a garment size (class="size"), the class probability would indicate the probability of the next or previous word belonging to another class, for example "color" or "type."

Word probability is the probability of a particular word appearing within the annotated sample of text from a source language 202 based on its class. A particular word may not always belong to the same class. Consider the word "small." In the phrase "small white blouse," "small" is a named entity of class "size." However, in the phrase "the white blouse has small buttons," "small" is not a named entity and doesn't belong to a class of interest. Thus, within the field of the disclosure the words in the sample may more generally be considered observations. That is, for an un-annotated sample to be tagged, the sequence of words is observable, but the class of each word (i.e. its state) is unknown. The model attempts to guess the proper state for each word. Within the field of the disclosure, the word probability may also be known as the emission probability, emission weight, or output probability. (For more explanation, see the description of FIG. 12, below). The CRF sequence trainer 206 uses the following monolingual features:

1. Token Position

Word token position 208 indicates whether or not a word is located at a position within the sentence that can help determine if the word is a named entity and, if so, what class of named entity it is. For example, being at the beginning or end of a sentence, or a certain distance from the beginning or the end can help determine if a word belongs to a class of named entity. These features are based on the observation that certain tokens (such as brand names in the title or description of a product) tend to appear at the beginning of the sentence, while others appear at the end.

2. Word Shape

Word shape 210 analyzes words for certain features that cause it to stand out from "normal" text. Word shape 210 features are binary. A binary feature is either present or not. Thus, a word either has a particular word shape 210 feature or it does not. Binary word shape 210 features such as whether a word is alphanumerical, has capitalization, or has certain pattern-based features (e.g., certain patterns may indicate products model numbers).

3. Title Presence

Title presence 212 is another binary feature that describes whether the token is in the product's title or not. For instance, if a word is in the title of an entry, there is a higher chance that it is a named entity. For example, a word found in a product's title has a higher chance to be a brand name than a word found in the product's description.

4. Proximate Keywords

Proximate keywords 214 precede or follow a word within distance a certain distance. For example, when analyzing the word "white" within the text string "small white blouse," "small" precedes "white" by one word and "blouse" follows by one word. Similarly, when analyzing "blouse" in the same string, "small" precedes "blouse" by two words.

Some named entities are often preceded with certain keywords. For instance, personal names in the newswire domain are often preceded with titles such as Dr., Mr., President, etc. In some embodiments, the keyword list may be domain-dependent. In other words, the important proximate keywords 214 in newswire may differ from the important keywords in an online store.

In another embodiment, proximate keywords 214 may be replaced by proximate classifications. For example, when analyzing the text string "small white blouse" the classification "size" precedes the classification "color," and the classification "type" follows it. In certain embodiments, this more generalized technique may produce superior results.

5. Universal Part of Speech Tags

Parts of Speech (POS) identify the function of a word within a sentence. Examples of parts of speech include nouns, verbs, adjectives, adverbs, etc. A particular word may have a different POS in a different sentence. For example, "cook" can be both a noun and a verb in English, depending on the sentence. Similarly, some parts of speech in a source language may not exist in all target languages.

Language-specific POS tags have been widely used in many NER systems. However, because the POS tagset for each language often has limited overlap with other languages' POS tagsets, a coarse-grained layer of POS tags called Universal POS is employed. One embodiment of Universal POS tags was proposed in Reference literature 1 (Petrov et al., 2011), which is incorporated by reference in its entirety. Universal Part of Speech (POS) tags 216 tag words with "universal" parts of speech rather than language-specific parts of speech. (Reference literature 1) Slav Petrov, Dipanjan Das, and Ryan McDonald. 2011. A universal part-of-speech tagset. arXiv preprint arXiv:1104.2086.

6. Gazetteers

A gazetteer 218 is a list of words and/or phrases that represent named entities. A gazetteer 218 may be analogous to a dictionary, glossary, or almanac of named entities. However, a gazetteer 218 in a NER system may only be a list. The additional details found for each entry in a dictionary, glossary, or almanac may be present, but are not necessary for the gazetteer 218 to function in an NER system. In one embodiment, one or more gazetteers 218 may include one or more classifications for each named entity in the list. One or more gazetteers 218 in from a source language may be incorporated into the CRF sequence labeling 206.

7. Brown Clustering (BC)

Numerical representations of words are used in many Natural Language Processing tasks. One particularly common method of using numerical representations of words was proposed by Brown et al., at IBM™ in 1992 (Reference literature 2 (Brown et al., 1992)) incorporated by reference in its entirety. This technique is therefore commonly referred to as IBM™ clustering or Brown Clustering 220.

(Reference literature 2) Peter F Brown, Peter V Desouza, Robert L Mercer, Vincent J Della Pietra, and Jenifer C Lai. 1992. Classbased n-gram models of natural language. Computational linguistics, 18(4):467-479.

Brown Clustering 220 analyzes a sample text to predict the probability of a particular string of characters appearing based on adjacent strings of characters.

Brown Clustering 220 performs this analysis based on "n-grams." An n-gram is a complex of n units of information. A unit of information may be an individual character of text, a word (delineated by spaces, tabs, commas, or other techniques as understood by those skilled in the art), a phrase of words, or a phonetic sound or syllable. Similarly, a Brown Clustering 220 model can truncate words to only analyze prefixes or suffices, or to exclude them. In other words, the types of n-grams that can be analyzed are limited only by necessity and human ingenuity. However, the most common types of n-grams are phonetic (e.g. for speech recognition), text characters (e.g. for predictive text entry), and words. For the remainder of this disclosure, examples of Brown Clustering 220 will be explained in terms of word-based n-grams, with the understanding that the techniques apply to any n-gram.

In its most general form, Brown Clustering 220 analyzes the sample text and predicts the probability of a particular word appearing at position "n" within the n-gram, based on the other n−1 words within the n-gram. For example, in a 2-gram (also known as a bigram), n−1=1, so a particular Brown Clustering 220 model would predict the probability of a word appearing based on either the preceding or the following word. This is the simplest implementation of Brown Clustering 220.

In a further example, a 3-gram Brown Clustering 220 model may predict the probability of a word appearing based on both the preceding and the following word. A 3-gram Brown Clustering 220 model could similarly predict the probability of a word appearing based on either the preceding two words or the following two words.

To generate a complete model, Brown Clustering 220 would analyze the probability of every word appearing in position n within an n-gram based on every possible combination of n−1 words. Thus, a 2-gram Brown Clustering 220 model would predict the probability of each distinct word in the sample text appearing adjacent to each distinct word within the sample text (including itself). If there are V distinct words within the sample, there are V possible n−1 completions to each n-gram. However, many of the possible n-grams would not appear in the sample and would thus have a predicted probability of zero. A 3-gram Brown Clustering 220 model would thus be exponentially larger because there are $V^2$ possible n−1 completions to each n-gram.

The predictive accuracy of a Brown Clustering 220 model can be further improved by dividing the distinct words in the sample into classes and incorporating the class or classes of the n−1 words in any given n-gram into the prediction. In one embodiment, one or more of the classes may be named entities in general or specific classes of named entities (e.g. color, size, etc.). Within the field of the disclosure, classes may also be called "clusters" (hence Brown Clustering).

In one embodiment, each individual word is represented by a bit string based on the calculated probabilities of it appearing in particular n-grams. In another embodiment, words can be classified based on these bit strings. More or less of the bit string may be used to classify the words, based on the desired granularity of the classification. Granularity in this case is the specificity or breadth of a given class. With maximum granularity or specificity, each word exists alone in its own class. This corresponds to minimum class breadth. Conversely, with minimum granularity, all words belong to a single class. This corresponds to maximum class breadth. In a preferred embodiment, the granularity with which words are classified is varied to obtain the optimum weights for each of the monolingual features.

After CRF sequence labeling 206 is completed, based on the monolingual features 208-220 the result is a weighted and annotated source-language named-entity recognition model 222. This source-language model 222 must then be extrapolated to one or more target languages. This extrapolation may also be called translation or mapping. The extrapolation is accomplished using Brown Clustering Mapping 300 and/or Gazetteer Expansion 400. Both Brown Clustering Mapping 300 and Gazetteer Expansion 400 take the annotated sample of text from the source language 202 and a sample text in the target language 204 as inputs. The output of the Brown Clustering Mapping 300 and/or Gazetteer Expansion 400 is then combined with the weighted and annotated source-language named-entity recognition model 222 to generate a weighted and annotated target-language named-entity recognition model 224.

Brown Clustering Mapping

Figure 3:
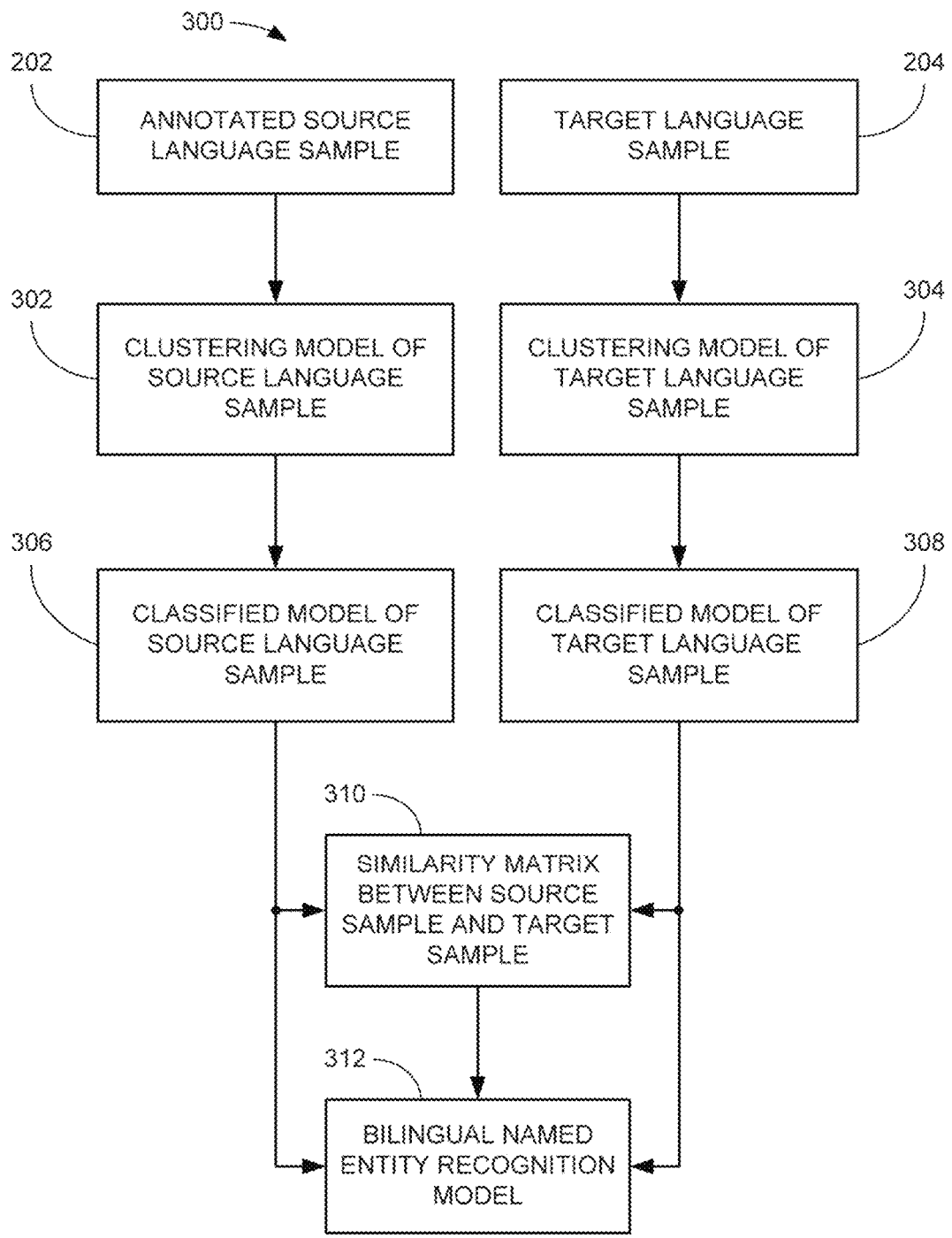
FIG. 3 is a block diagram of information elements used in Brown clustering mapping and illustrating the informational inputs, intermediary information, and informational outputs, in accordance with the present disclosure.

Referring now to FIG. 3, which is a block diagram of information elements used in Brown Clustering mapping 300 and illustrating the informational inputs, intermediary information, and informational outputs. Brown Clustering Mapping 300 begins with the vocabularies in the source and target languages, the annotated sample of text from the source language 202 and a sample text in the target language 204. Brown clustering is then performed separately on each vocabulary, generating a clustering model of the source language sample 302 and a clustering model of the target language sample 304. In some embodiments, these models may be expressed in a matrix of probabilities, as explained above. Brown clustering classification is then performed on each clustering model, generating a model of the source language sample 306 and generating a classified model of the target language sample 308. A similarity matrix 310 is then generated between the classified model of the source language sample 306 and the classified model of the target language sample 308. This similarity matrix 310 is then combined with the classified model of the source language sample 306 and the classified model of the target language sample 308 to generate a bilingual named entity recognition model 312.

Each element in the similarity matrix 310 is a numerical value representing a similarity between a class in the classified model of the source language sample 306 and a classification in the classified model of the target language sample 308. The numerical value of the element is found by maximizing the weighted average of a word similarity function. The word similarity function compares each word from a particular source classification with each word from the target classification it is being compared with. The weighted average is calculated by adding the output of the word similarity function for each pair of words from the source class and the target class and dividing by the product of the number of words in the source class and the target class. In one embodiment, the weighted average of the similarity function is maximized stochastically. In another embodiment, the weighted average of the similarity function is maximized iteratively. The process of Brown Clustering Mapping 300 is summarized mathematically below:

| | | |
|---|---|---|
| $V_S = \{w_1^S, w_2^S, \ldots w_{N_S}^S,\}$ | Source vocabulary | (annotated sample of $N_S$ words (w) from the source language) |
| $V_T = \{w_1^T, w_2^T, \ldots w_{N_T}^T,\}$ | Target vocabulary | (sample of $N_T$ words (w) from the target language) |
| $C_S = \{c_1^S, c_2^S, \ldots c_{N_S}^S,\}$ | Source classifications | ($N_S$ classes (c) from the Brown clustering model of the source sample) |
| $C_T = \{c_1^T, c_2^T, \ldots c_{N_T}^T,\}$ | Target classifications | ($N_S$ classes (c) from the Brown clustering model of the source sample) |

$$c^{S*} = \mathrm{argmax}_{c^S \in c_S} sim_c(c^s, c^T) \text{ for each } c_T \in C_T \quad (1)$$

$$sim_c(c^S, c^T) = \frac{1}{|c^S||c^T|} \sum_{w^S \in c^S, w^T \in c^T} sim_w(w^s, w^T) \quad (2)$$

A number of different word similarity functions may be used in Brown Clustering Mapping 300. Four exemplary word similarity functions are presented below, but a person skilled in the art will understand that other word similarity functions may also be used.

1. Exact Match String Similarity

For exact match string similarity, the word similarity function will return a first value if a word from a source class is exactly the same as a word from a target class, i.e., the text strings are identical in each language. A different value is returned if the words are not exactly identical. Common values are 1 for a match and 0 for a non-match. This concept can be illustrated mathematically as:

$$sim_w(w^S, w^T) = \begin{cases} 1 & \text{if } w_i = w_j \\ 0 & \text{otherwise} \end{cases} \quad (3)$$

2. Edit Distance String Similarity

Sometimes, the source and target words may be similar but not exactly identical. For these situations, edit distant string similarity may be more appropriate. Edit distance is a measurement of the minimum number of changes to a first string to create an exact match of a second string. Changes can included include adding characters, deleting characters, and swapping characters. For example, changing the string "smite" to "smiley" would require swapping "1" for "t" and adding "y." Therefore, the edit distance between "smite" and "smiley" is 2. Many means of generating edit distance are known in the art, for example Levenshtein distance. For edit distance string similarity the word similarity function will return a first value if the edit distance between a word from a source class and a word from a target class is less than a threshold value, $\Theta$. A different value is returned if the edit distance exceeds the threshold. Common values are 1 for an edit distance below the threshold and 0 otherwise. This concept can be illustrated mathematically as:

$$sim_w(w^S, w^T) = \begin{cases} 1 & \text{if levenshtein\_distance}(w_i, w_j) < \theta \\ 0 & \text{otherwise} \end{cases} \quad (4)$$

3. Binary Synset Similarity

Synsets are lists or groups of words that are synonymous. A synset may be confined to a single language or include synonyms from multiple languages.

Binary synset similarity compares a word from a target-language class to the synset for a word from a source-language class, i.e., to a list of synonyms for the word in the source-language class. For binary synset similarity, the word similarity function will return a first value if a word from a target class is exactly the same as a word within the synset for a word from a source class. A different value is returned if the words are not exactly identical. Common values are 1 for a match and 0 for a non-match. In one embodiment, BabelNet synsets may be used, as explained by Navigli and Ponzetto, 2012 (Reference literature 3), incorporated by reference in its entirety. In another embodiment, WordNet synsets may be used. Other synsets may also be used in other embodiments, as will be understood by those having ordinary skill in the art.

(Reference literature 3) Roberto Navigli and Simone Paolo Ponzetto. 2012. BabelNet: The automatic construction, evaluation and application of a wide-coverage multilingual semantic network. Artificial Intelligence, 193:217-250.

For example, if the English synset for "baby grand" includes "keyboard" and "piano," then comparing "piano" in Spanish to "baby grand" in English will return a match because "piano" is in the synset for "baby grand." This concept can be illustrated mathematically as:

$$sim_w(w^S, w^T) = \begin{cases} 1 & \text{if } w^T \in \text{synset}(w^S) \\ 0 & \text{otherwise} \end{cases} \quad (5)$$

4. Frequency-Weighted Synset Similarity

During Brown clustering, the predicted probability for less-frequently appearing words can be less reliable. Because the classes generated for the word similarity function are generated using Brown clustering, it may be desirable to further refine binary synset similarity by adding a frequency-weighted component. For example, binary matrix generated by the binary synset similarity function above can be modified by another function which represents the frequency of one or both of the words being compared at each element of the matrix. In one exemplary embodiment, each element of the binary synset similarity matrix may be multiplied by the sum of the base-ten logarithm of the frequency with which the source word appears and the base-ten logarithm of the frequency with which the target word appears. This concept can be illustrated mathematically as:

$$sim_w^{binary}(w^S, w^T) = \begin{cases} 1 & \text{if } w^T \in \text{synset}(w^S) \\ 0 & \text{otherwise} \end{cases} \quad (6)$$

$$sim_w^{weighted}(w^S, w^T) = [\log f(w^S) + \log f(w^T)] \times sim_w^{binary}(w^S, w^T) \quad (7)$$

where f(w) is the frequency of a given word. A person having ordinary skill in the art will understand that other frequency-weighting metric can be used. A person having ordinary skill in the art will also understand that the frequency of appearance can be within the class or within the entire text sample.

Gazetteer Expansion

As noted above, a gazetteer is a list of words and/or phrases that represent named entities. Gazetteer expansion uses graph-based semi-supervised learning to expand the gazetteers in the source language to the target language. For example, given the string "New York" in a source-language (i.e. English=$L_S$) gazetteer, it is desirable to map "New York" to a corresponding word in a gazetteer in the target language (e.g., $L_T$= Spanish). Although there is no direct link between "New York" and "Nueva York," one might infer that "Puerto Rico" (in English) is similar to "New York" based on some intra-language semantic similarity model. "Nueva York" is likewise similar to "Puerto Rico" (in Spanish), again based on the Spanish intralanguage similarity model. Then, because "Puerto Rico" is actually identical in both languages, "New York" can be mapped to "Neuva York." This indirect inference of beliefs from the source gazetteers to the target can be modeled by semi-supervised graph propagation (Reference literature 4 (Zhu et al. 2003), incorporated by reference in its entirety), where graph nodes are $V_S \cup V_T$, positive labels are entries in the $L_S$ gazetteer to be expanded to $L_T$. Negative labels are entries in other, different gazetteers within $L_S$.

(Reference literature 4) Xiaojin Zhu, Zoubin Ghahramani, and John Lafferty. 2003. Semi-supervised learning using gaussian fields and harmonic functions. In IN ICML, pages 912-919.

Figure 4:
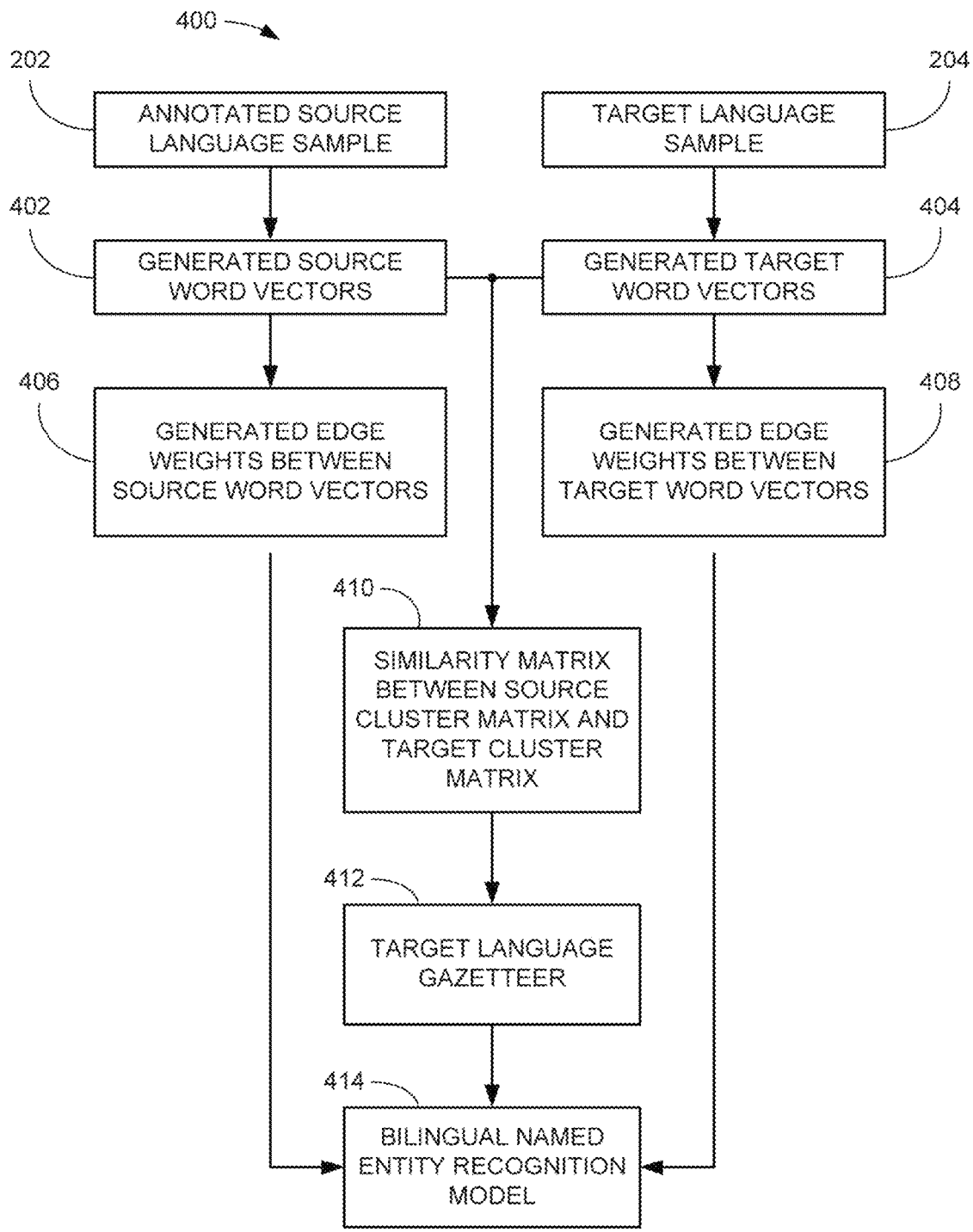
FIG. 4 is a block diagram of information elements used in gazetteer expansion and illustrating the informational inputs, intermediary information, and informational outputs, in accordance with the present disclosure.

FIG. 4 is a block diagram of information elements used in gazetteer expansion and illustrating the informational inputs, intermediary information, and informational outputs. Each word in the annotated sample of text from the source language 202 is converted into a numerical representation of the word, i.e. a source word vector 402. Similarly, each word in the sample text in the target language 204 is converted into a numerical representation of the word, i.e. a source word vector 404. Then source word edge weights 406 are generated between all of the source word vectors 402 and target word edge weights 408 are generated between all of the target word vectors 404. A similarity matrix 410 is then generated between each of the source word vectors 402 and each of the target word vectors 404. Finally, the similarity matrix 410, source word edge weights 406, and target word edge weights 408 are combined to generate a target-language gazetteer 412. The target-language gazetteer 412 is then used to generate a bilingual NER model 414.

Edge weights represent the similarity between words. Many methods may be used to generate edge weights within a given set, as will be understood by one having ordinary skill in the art. In one embodiment, the edge weights between same-language nodes $w_i$ and $w_j$ are given by exp$(-\sigma \|w_i.w_j\|)$ where $w_i$ is the distributed vector representation of word $w_i$ computed by the program word2vec. Other vectorization programs may alternately be used, as will be understood by those having ordinary skill in the art. The edge weights between node $w_i \in V_S$ and $w_j \in V_T$ are defined as a first value (e.g. 1) if the spelling of these two words are identical and another value (e.g. 0) otherwise. Since the analytical solution to this propagation involves the computation of an n×n (n is the number of unlabeled nodes) matrix, it can be approximated by running the three propagation steps iteratively, namely, $L_S \rightarrow L_S$, $L_S \rightarrow L_T$, and $L_T \rightarrow L_T$. After the propagation, all the nodes with propagated values $f(w_i) > \Theta$ are entered as entities in the new gazetteer.

Working Example

The following is an experimental working example illustrating the implementation and performance of one embodiment of the disclosure.

1. Datasets

The targeted dataset contains a list of products (titles and descriptions). The titles of products are approximately ten words long and poorly structured, which adds difficulty to the recognition task. In e-commerce, there is a need to introduce new named entity tagsets, as opposed to the conventional ones: person, location, and organization. This experiment introduced 6 new tag types: 1) Color; 2) Brand names; 3) Size; 4) Type: e.g. camera, shirt; 5) Material: e.g. plastic, cotton; and 6) Model: the model number of a product (e.g. A1533). For the remainder of the experiment, the source and target languages were English and Spanish, respectively. The datasets used were: i) Brown clustering dataset: Rakuten shopping (Rakuten, 2013a) data for English and Spanish in addition to Spanish Wikipedia dump (Al-Rfou', 2013); ii) Training data: 1800 annotated English products from English Rakuten shopping; iii) Test data: 300 annotated Spanish products from Rakuten Spain (Rakuten, 2013b).

2. Baseline

Because the techniques of this disclosure are novel, a strong baseline was needed to compare results to. Given the language pair ($L_S$; $L_T$), the Microsoft™ Bing™ Translate API was used to generate the $L_T$ to $L_S$ translation. The $L_S$ NER model was then applied on the translated text and NER performance evaluated by mapping the tagged tokens back to $L_T$ using the word alignments generated by Bing™ Translate.

3. Results & Discussion

Figure 13:
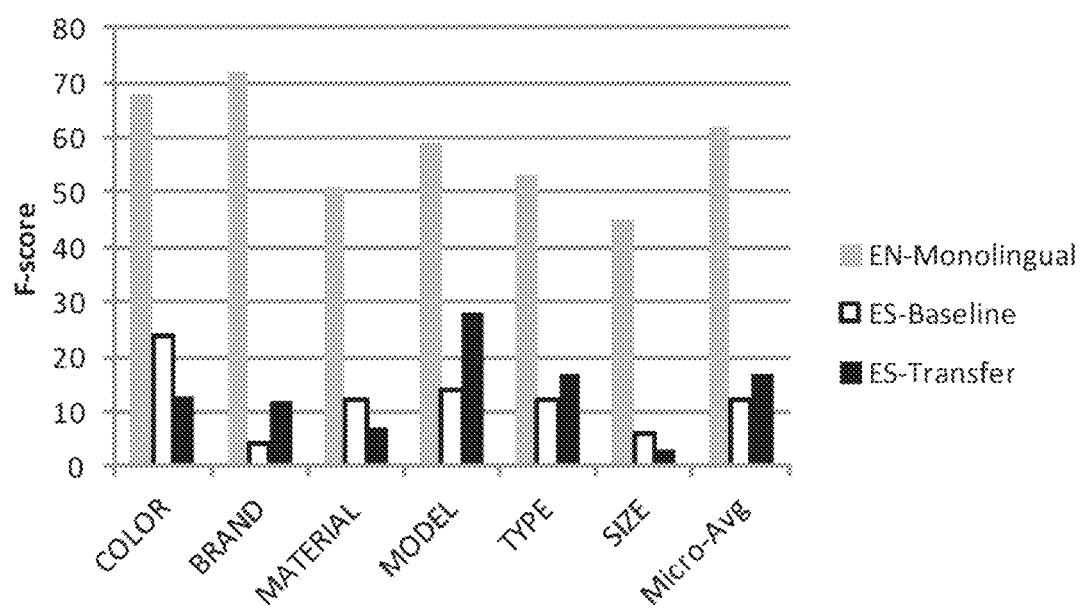
FIG. 13 is a graph of test results showing the performance of the disclosed techniques versus conventional methods.

For each studied language sentences were tokenized and POS tags were assigned, using Stanford CoreNLP (Reference literature 5 (Manning et al., 2014), incorporated by reference in its entirety) for English and TreeTagger (Reference literature 6 (Schmid, 1994) incorporated by reference in its entirety) for Spanish. The English monolingual performance (80:20 train/test split and 5-folds cross validation) was considerably lower that state-of-the-art English NER systems, which was mainly due to the nature of the targeted domain and the named-entity tagset and the small amount of training data. The small amount of training data had a significant impact on the monolingual results, on the baseline, and on the proposed system performance. Although the performance of the proposed system was low, it surpassed the baseline performance in most of the tag types and yielded an overall improvement on the micro-average F-score of approximately +13%. Since the "Model" tag is the most language independent tag, it produces the best F-score among the tags. It should be noted that the poor baseline performance is largely due to the poor quality of word alignment generated by machine translation. Further observations include that i) Brown clustering features mainly improve the "Brand" tag; and ii) the Gazetteers expansion technique shows comparable performance (0.3%) to using Google™-translated $L_S$ gazetteers. FIG. 13 is a graph of test results showing the performance of the disclosed techniques versus conventional methods.

(Reference literature 5) Christopher D. Manning, Mihai Surdeanu, John Bauer, Jenny Finkel, Steven J. Bethard, and David McClosky. 2014. The Stanford CoreNLP natural language processing toolkit. In Proceedings of 52nd Annual Meeting of the Association for Computational Linguistics: System Demonstrations, pages 55-60.

(Reference literature 6) Helmut Schmid. 1994. Probabilistic part-of-speech tagging using decision trees.

Figure 5:
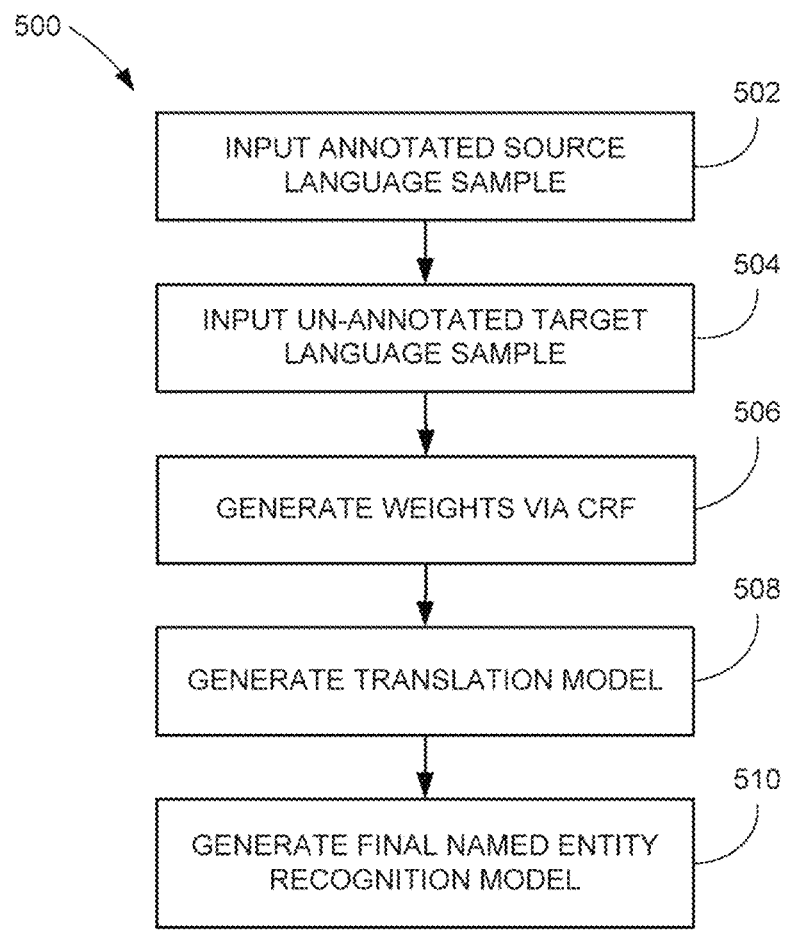
FIG. 5 is a flow chart depicting a process for generating a Named Entity Recognition model in a target language, in accordance with the present disclosure.

FIG. 5 is a flow chart depicting a process 500 for generating a Named Entity Recognition model in a target language. At 502 an annotated sample of the source language is obtained. At 504 an un-annotated sample of the source language is obtained. At 506, CRF is used to generate feature weights for the source and target language samples. At 508, a translation model between the source and target language is generated. At 510 a final NER model is generated.

Figure 6:
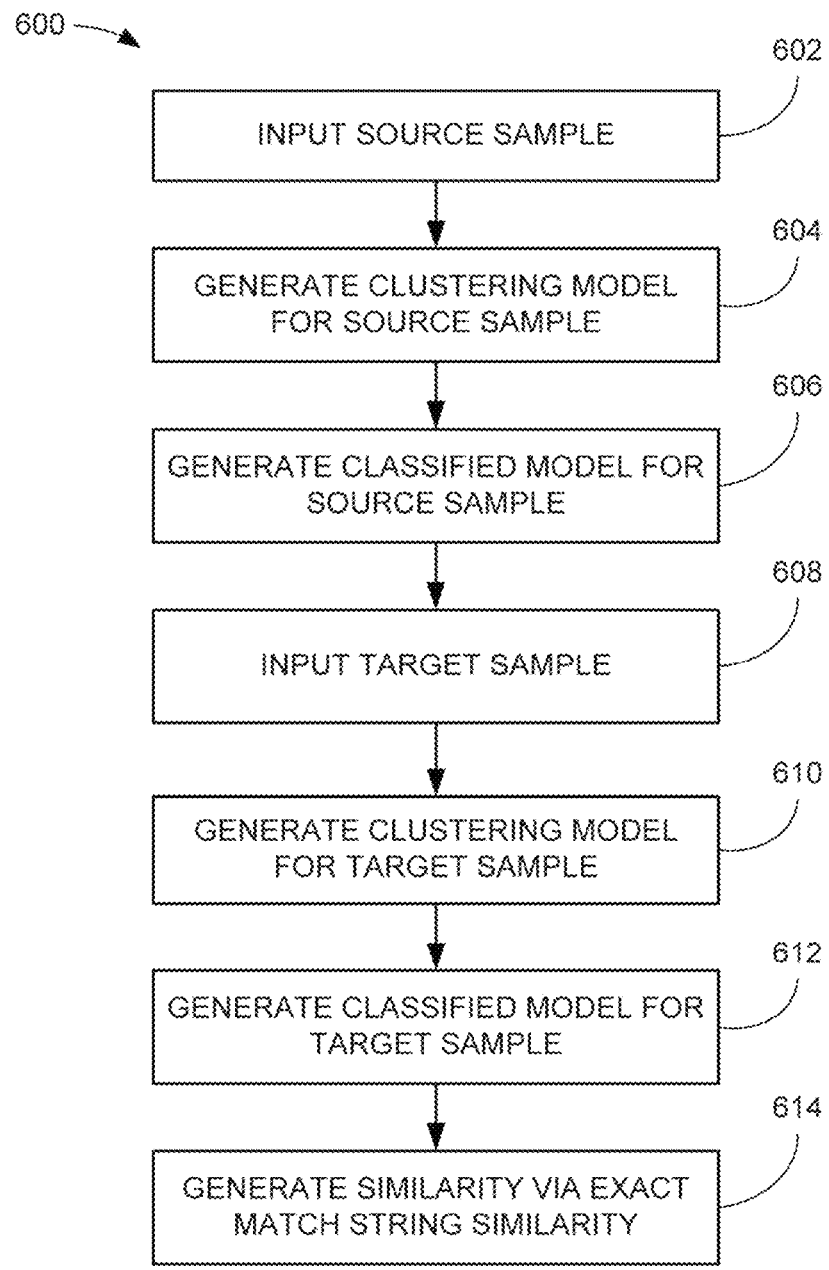
FIG. 6 is a flow chart depicting a process for generating a numerical representation of word similarity between a source and target language using Brown clustering mapping and exact match string similarity, in accordance with the present disclosure.

FIG. 6 is a flow chart depicting a process 600 for generating a numerical representation of word similarity between a source and target language using Brown clustering mapping and exact match string similarity. At 602 an annotated sample of the source language is obtained. At 604 a clustering model is generated for the annotated source-language sample. At 606 a classified model is generated for the annotated source-language sample based on the clustering model. At 608, an un-annotated sample of the source language is obtained. At 610 a clustering model is generated for the annotated target-language sample. At 612 a classified model is generated for the annotated target-language sample based on the clustering model. At 614, similarity metrics between the source classified model and the target classified model are generated using exact match string similarity.

Figure 7:
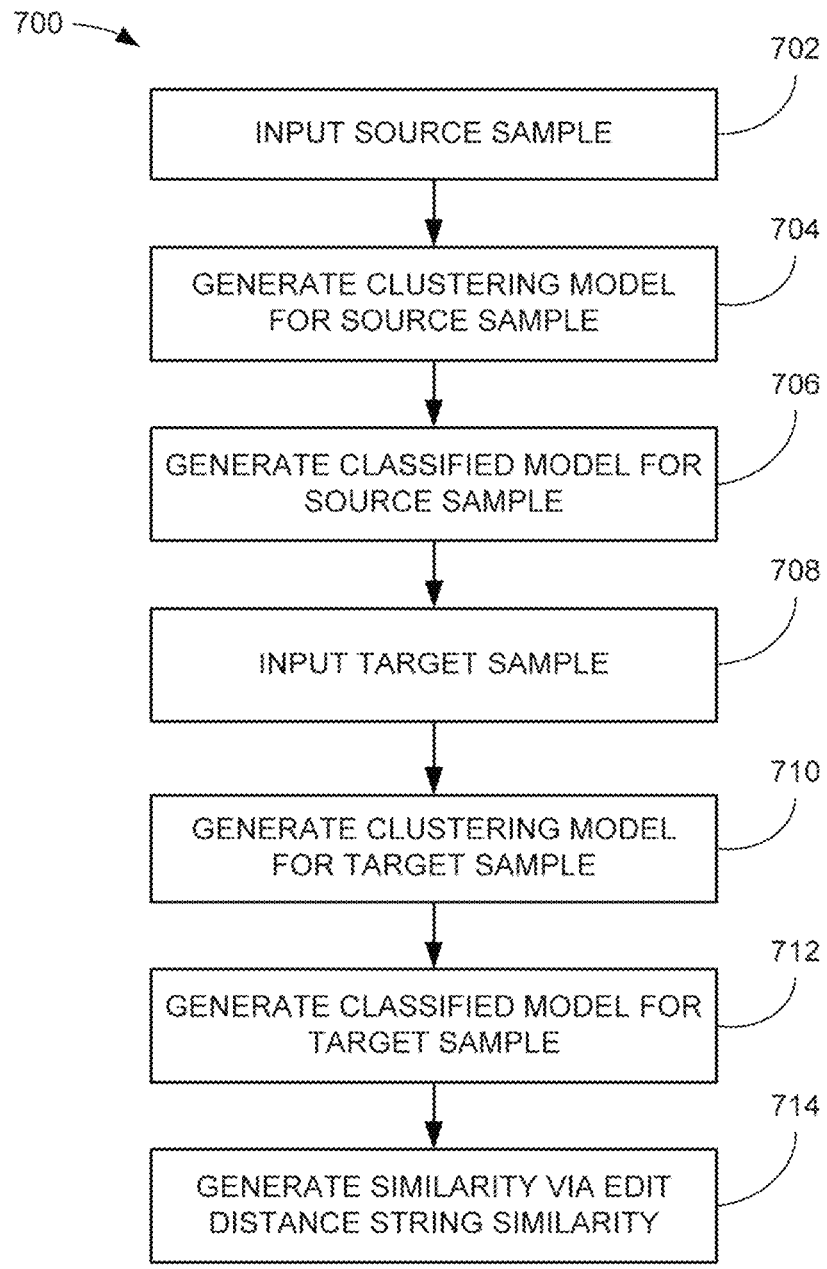
FIG. 7 is a flow chart depicting a process for generating a numerical representation of word similarity between a source and target language using Brown clustering mapping and edit distance string similarity, in accordance with the present disclosure.

FIG. 7 is a flow chart depicting a process 700 for generating a numerical representation of word similarity between a source and target language using Brown clustering mapping and edit distance string similarity. At 702 an annotated sample of the source language is obtained. At 704 a clustering model is generated for the annotated source-language sample. At 706 a classified model is generated for the annotated source-language sample based on the clustering model. At 708, an un-annotated sample of the source language is obtained. At 710 a clustering model is generated for the annotated target-language sample. At 712 a classified model is generated for the annotated target-language sample based on the clustering model. At 714, similarity metrics between the source classified model and the target classified model are generated using edit distance string similarity.

Figure 8:
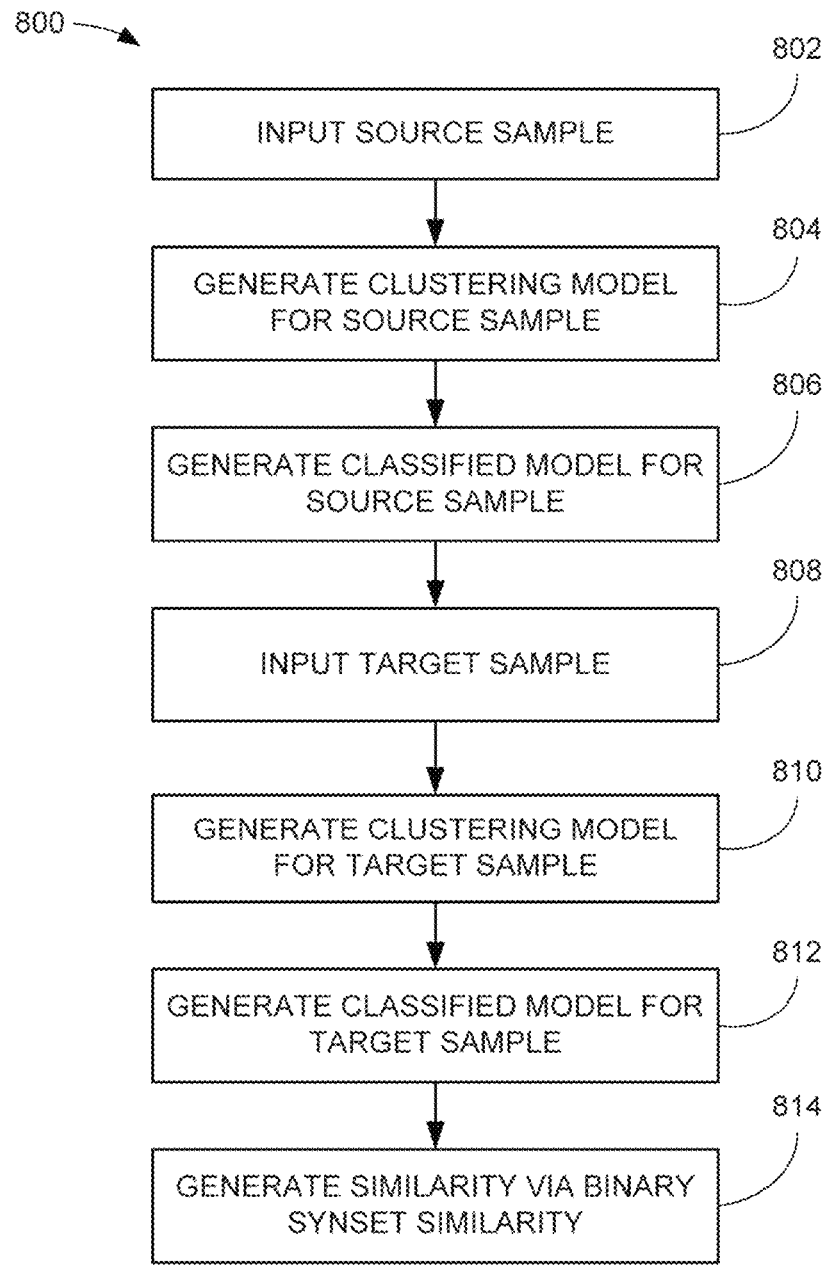
FIG. 8 is a flow chart depicting a process for generating a numerical representation of word similarity between a source and target language using Brown clustering mapping and binary synset similarity, in accordance with the present disclosure.

FIG. 8 is a flow chart depicting a process 800 for generating a numerical representation of word similarity between a source and target language using Brown clustering mapping and binary synset similarity. At 802 an annotated sample of the source language is obtained. At 804 a clustering model is generated for the annotated source-language sample. At 806 a classified model is generated for the annotated source-language sample based on the clustering model. At 808, an un-annotated sample of the source language is obtained. At 810 a clustering model is generated for the annotated target-language sample. At 812 a classified model is generated for the annotated target-language sample based on the clustering model. At 814, similarity metrics between the source classified model and the target classified model are generated using binary synset similarity.

Figure 9:
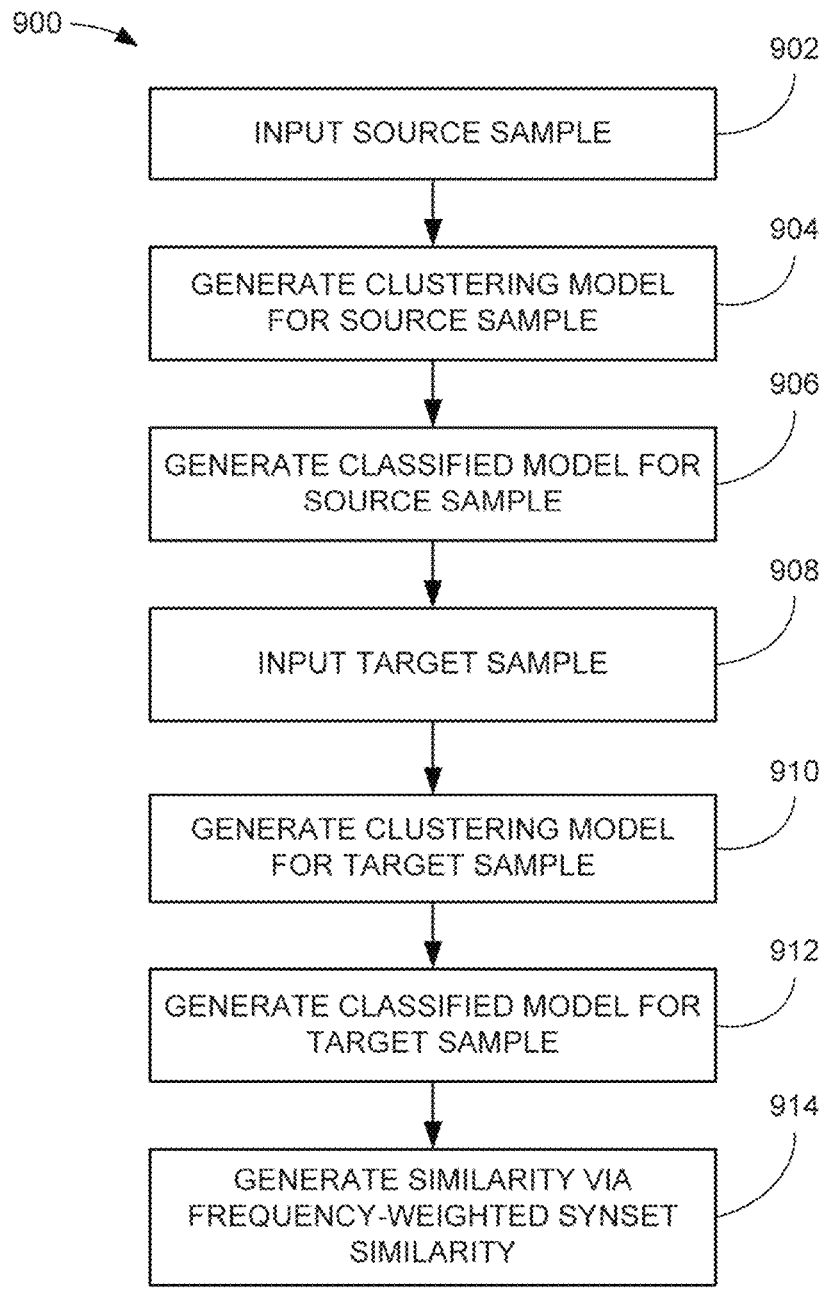
FIG. 9 is a flow chart depicting a process for generating a numerical representation of word similarity between a source and target language using Brown clustering mapping and frequency-weighted synset similarity, in accordance with the present disclosure.

FIG. 9 is a flow chart depicting a process 900 for generating a numerical representation of word similarity between a source and target language using Brown clustering mapping and frequency-weighted synset similarity. At 902 an annotated sample of the source language is obtained. At 904 a clustering model is generated for the annotated source-language sample. At 906 a classified model is generated for the annotated source-language sample based on the clustering model. At 908, an un-annotated sample of the source language is obtained. At 910 a clustering model is generated for the annotated target-language sample. At 912 a classified model is generated for the annotated target-language sample based on the clustering model. At 914, similarity metrics between the source classified model and the target classified model are generated using frequency-weighted synset similarity.

Figure 10:
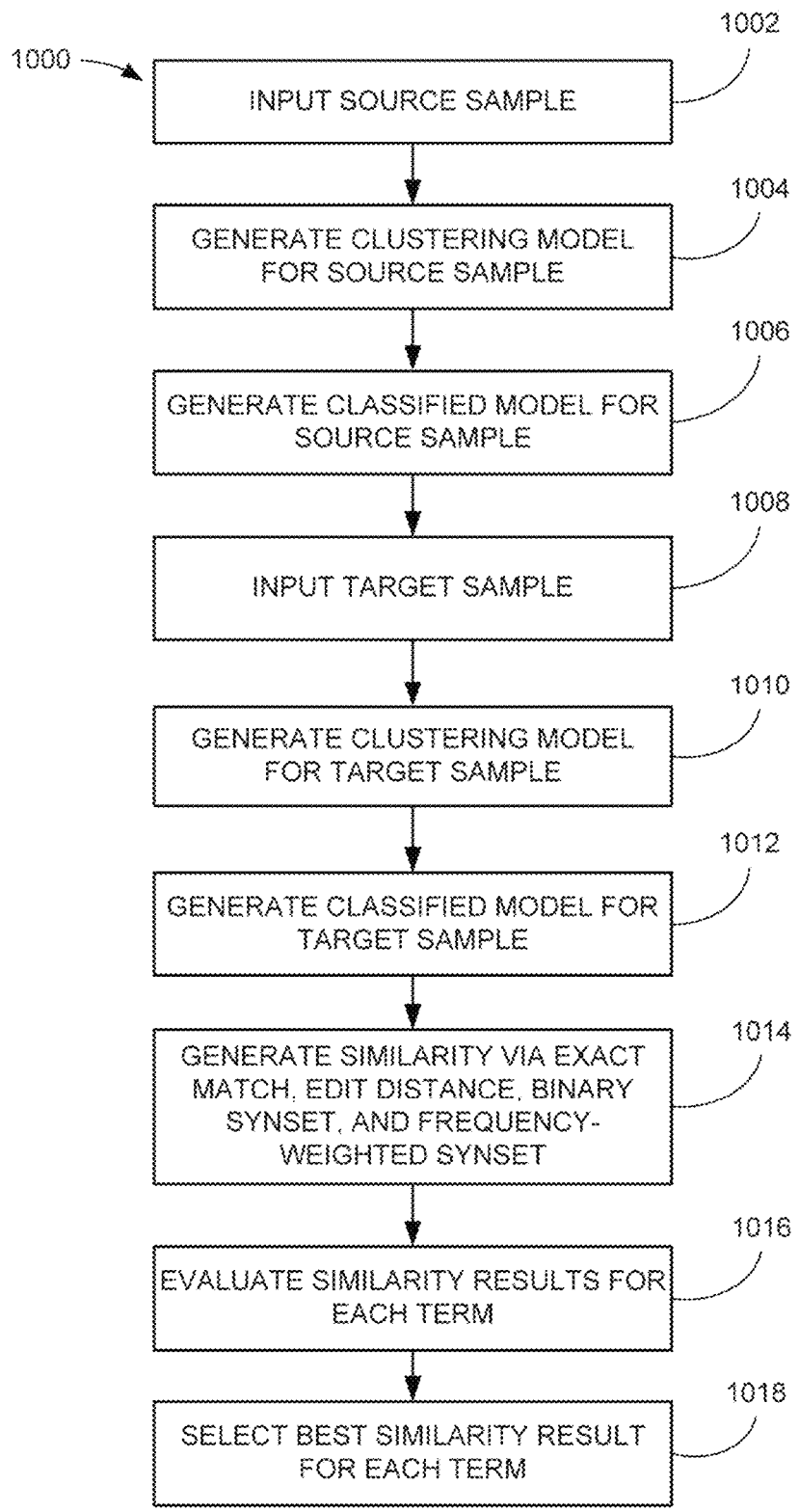
FIG. 10 is a flow chart depicting a process for generating a numerical representation of word similarity between a source and target language using Brown clustering mapping and a combination of exact match, edit distance, binary synset, and frequency-weighted synset, in accordance with the present disclosure.

FIG. 10 is a flow chart depicting a process 1000 for generating a numerical representation of word similarity between a source and target language using Brown clustering mapping and a combination of exact match, edit distance, binary synset, and frequency-weighted synset. At 1002 an annotated sample of the source language is obtained. At 1004 a clustering model is generated for the annotated source-language sample. At 1006 a classified model is generated for the annotated source-language sample based on the clustering model. At 1008, an un-annotated sample of the source language is obtained. At 1010 a clustering model is generated for the annotated target-language sample. At 1012 a classified model is generated for the annotated target-language sample based on the clustering model. At 1014, similarity metrics between the source classified model and the target classified model are generated using exact match string similarity, edit distance string similarity, binary synset similarity, and frequency-weighted synset similarity. At 1016, the similarity results from each method in step 1014 are evaluated for each class. At 1018, the best similarity results for each class are selected.

Figure 11:
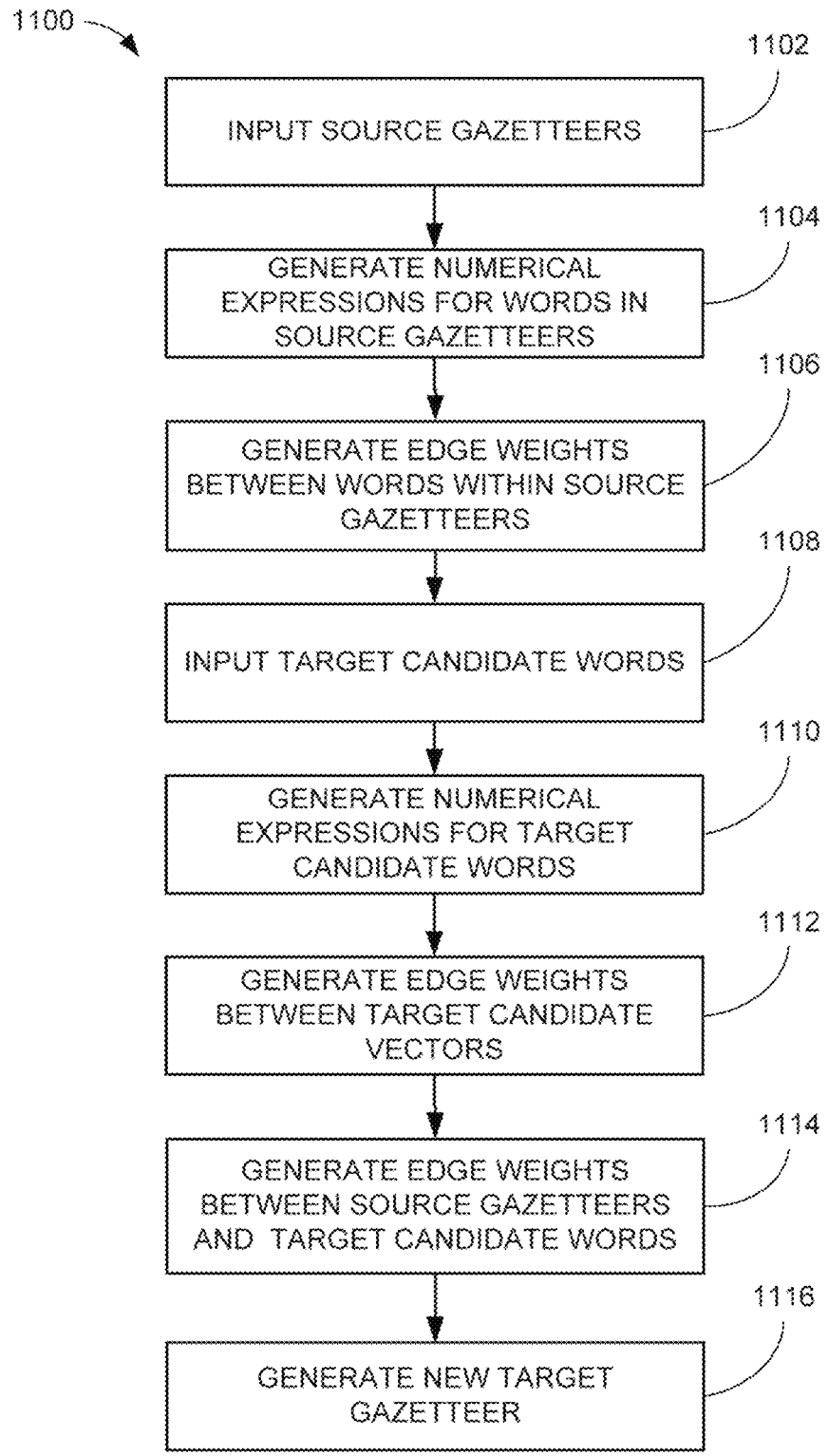
FIG. 11 is a flow chart depicting another process for generating a numerical representation of word similarity between a source and target language using gazetteer expansion, in accordance with the present disclosure.

FIG. 11 is a flow chart depicting another process 1100 for generating a numerical representation of word similarity between a source and target language using gazetteer expansion. At 1102 a source-language gazetteer is obtained. At 1104 numerical representations (e.g. vectors) are generated for each word source-language gazetteer. At 1106, edge weights are generated for the source-language gazetteer based on the numerical representations. At 1108, candidate words for a target-language gazetteer are obtained. At 1110 numerical representations (e.g. vectors) are generated for each candidate target-language word. At 1112, edge weights are generated for each candidate target-language word based on the numerical representations. At 1114, edge weights are generated between the source-language gazetteer and the candidate target-language words. At 1116, a new target-language gazetteer is generated based on the previously-generated edge weights.

Figure 12:
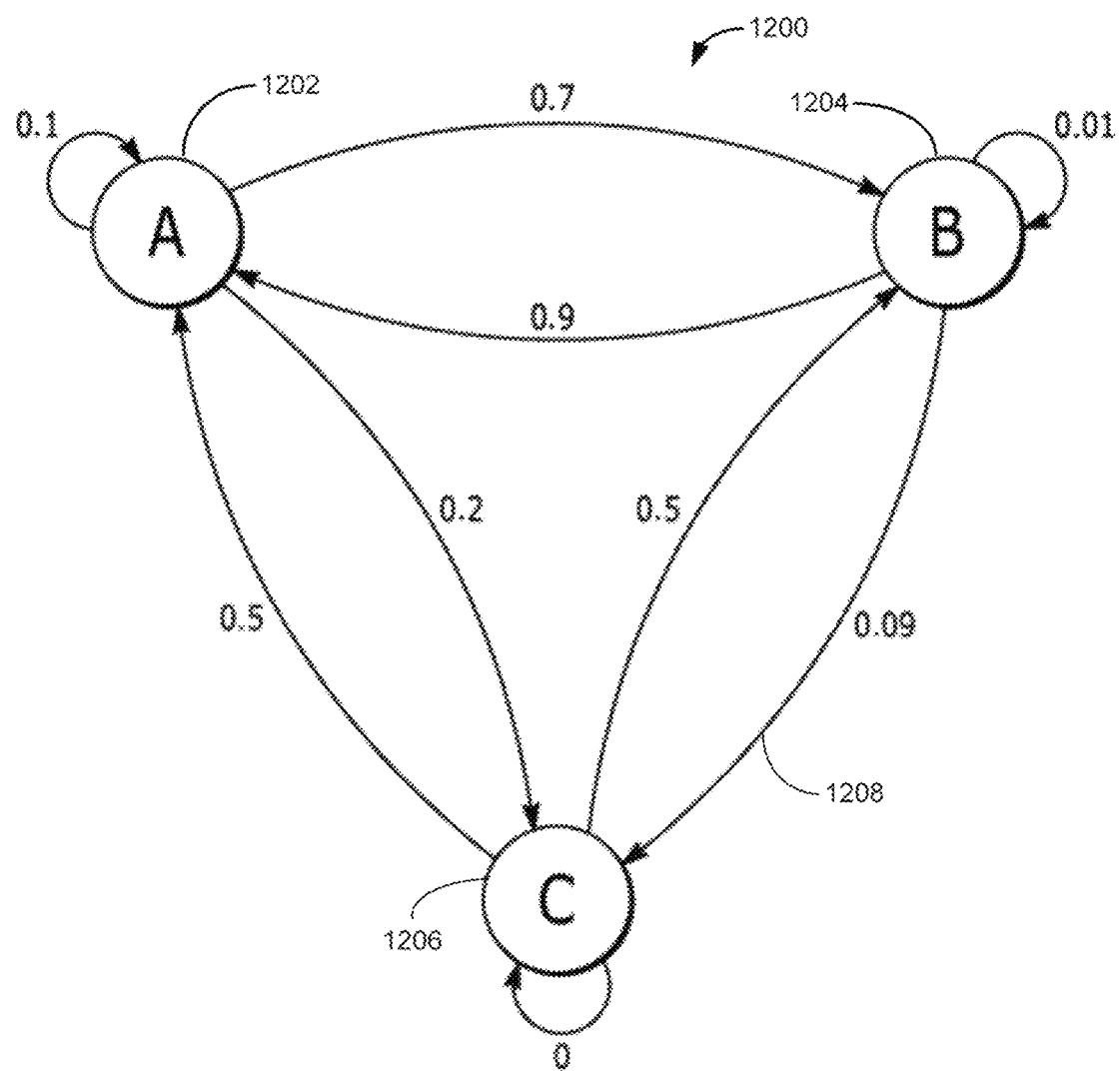
FIG. 12 is a diagram illustrating the concept of edge weights, in accordance with the present disclosure.
Figure 12:
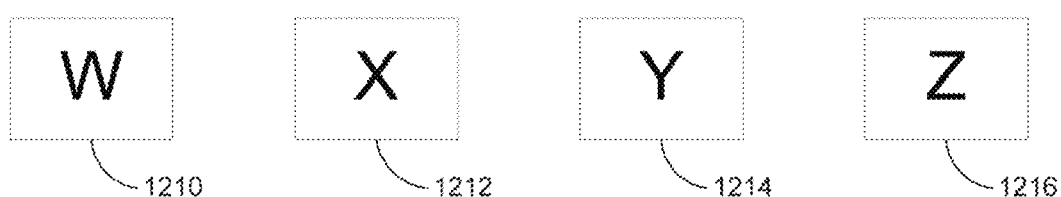

FIG. 12 is a diagram illustrating the concept of edge weights and emission weights. Three states, A 1202, B 1204, and C 1206 are shown, as well as four observations: W 1210, X 1212, Y 1214, and Z 1216. For each state 1202-1206 edge weights 1208 indicate the probability of the next word being state A, B, or C based on the current state. Also, for each observation, W, X, Y, and Z, emission weights 1210 //not shown// indicate the probability that the observation belongs to a particular class.

Figure 14:
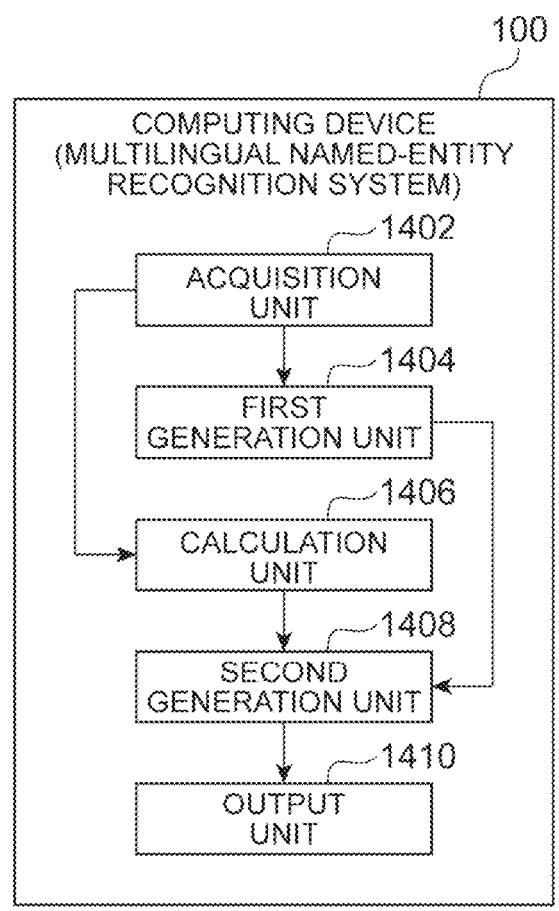
FIG. 14 is a diagram showing the functional configuration of computer system, in accordance with the present disclosure.

FIG. 14 shows an example of the functional configuration of a computing device 100, which functions as a multilingual named-entity recognition system described above. In this example, the computing device 100 includes an acquisition unit 1402, a first generation unit 1404, a calculation unit 1406, a second generation unit 1408, and an output unit 1410.

The acquisition unit 1402 is a functional element that acquires an annotated source-language sample and a target-language sample. The acquisition unit 1402 may acquire those samples from a predetermined database or may receive those samples from another device. The acquisition unit 1402 outputs the acquired annotated source-language sample to the first generation unit 1404. Further, the acquisition unit 1402 outputs the acquired annotated source-language sample and target-language sample to the calculation unit 1406.

The first generation unit 1404 is a functional element that generates an annotated source-language named-entity recognition model. The first generation unit 1404 applies Conditional Random Field (CRF) sequence labeling to the annotated source-language sample and obtains the optimum weights for each annotated source-language named entity. The annotated source-language named-entity recognition model is thereby obtained. For example, the first generation unit 1404 generates the annotated source-language named-entity recognition model by optimizing class probabilities and word probabilities for each annotated source-language named entity. The first generation unit 1404 outputs the named-entity recognition model to the second generation unit 1408.

The calculation unit 1406 is a functional element that calculates similarity between the annotated source-language sample and the target-language sample. For example, the calculation unit 1406 calculates the similarity by using at least one of Brown clustering mapping and gazetteer expansion. The calculation unit 1406 outputs the similarity to the second generation unit 1408.

The second generation unit 1408 is a functional element that generates a target-language named-entity recognition model based on the annotated source-language named-entity recognition model and the similarity. The second generation unit 1408 outputs the annotated source-language named-entity recognition model and the target-language named-entity recognition model to the output unit 1410.

The output unit 1410 is a functional element that outputs the generated named-entity recognition model. The output unit 1410 outputs at least the target-language named-entity recognition model. The output unit 1410 may output the annotated source-language named-entity recognition model. An output method is not limited. For example, the output unit 1410 may store the named-entity recognition model into a specified database, transmit it to another computer, display it on a monitor, or output it to a printer.

Figure 15:
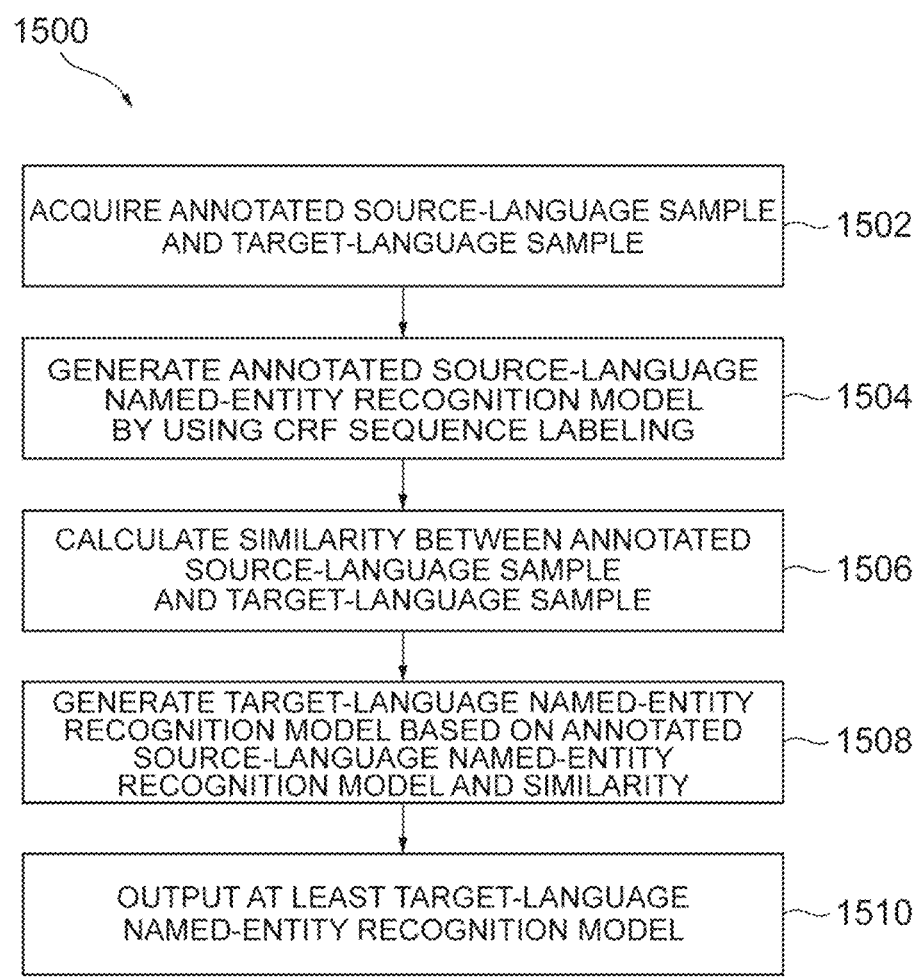
FIG. 15 is a flowchart showing a multilingual named-entity recognition method, in accordance with the present disclosure.

FIG. 15 is an example of a flowchart showing the multilingual named-entity recognition method described above. This method is performed by the computing device 100 (multilingual named-entity recognition system) including a processor, for example.

First, the acquisition unit 1402 acquires an annotated source-language sample and a target-language sample (Step S1502, acquisition step). Next, the first generation unit 1404 generates an annotated source-language named-entity recognition model by applying CRF sequence labeling to the annotated source-language sample and obtaining the optimum weights for each annotated source-language named entity (Step S1504, first generation step). Then, the calculation unit 1406 calculates the similarity between the annotated source-language sample and the target-language sample (Step S1506, calculation step). After that, the second generation unit 1408 generates a target-language named-entity recognition model based on the annotated source-language named-entity recognition model and the similarity (Step S1508, second generation step). Finally, the output unit 1410 outputs at least the target-language named-entity recognition model (Step S1510, output step).

Figure 16:
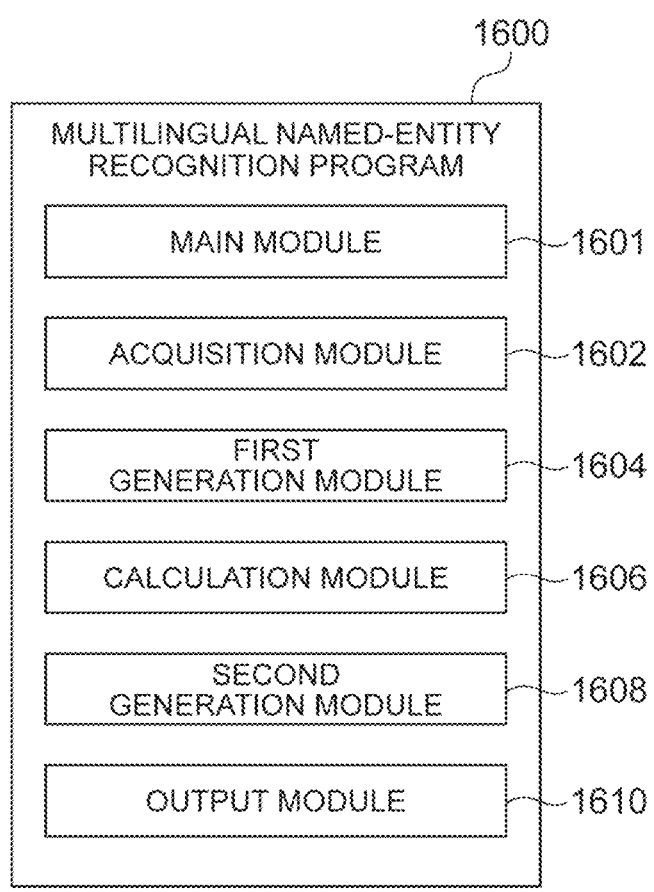
FIG. 16 is a diagram showing the configuration of a multilingual named-entity recognition program, in accordance with the present disclosure.

FIG. 16 is a diagram showing an example of a program (multilingual named-entity recognition program) causing a computer to execute the above-described multilingual named-entity recognition method.

The program 1600 includes a main module 1601, an acquisition module 1602, a first generation module 1604, a calculation module 1606, a second generation module 1608, and an output module 1610. The main module 1601 is a part that exercises control over multilingual named-entity recognition model generation.

The functions implemented by executing the acquisition module 1602, the first generation module 1604, the calculation module 1606, the second generation module 1608 and the output module 1610 are respectively equal to the functions of the acquisition unit 1402, the first generation unit 1404, the calculation unit 1406, the second generation unit 1408 and the output unit 1410 described above. The program 1600 may be provided in the form of being recorded in a static manner on a tangible recording medium such as CD-ROM, DVD-ROM or semiconductor memory, for example. Alternatively, the program 1600 may be provided as a data signal superimposed onto a carrier wave through a communication network.

As described above, a multilingual named-entity recognition system according to an aspect of the present application includes an acquisition unit configured to acquire an annotated sample of a source language and a sample of a target language, a first generation unit configured to generate an annotated named-entity recognition model of the source language by applying Conditional Random Field sequence labeling to the annotated sample of the source language and obtaining an optimum weight for each annotated named entity of the source language, a calculation unit configured to calculate similarity between the annotated sample of the source language and the sample of the target language, and a second generation unit configured to generate a named-entity recognition model of the target language based on the annotated named-entity recognition model of the source language and the similarity.

A multilingual named-entity recognition method according to an aspect of the present application is a multilingual named-entity recognition method executed by a computer, the method including an acquisition step of acquiring an annotated sample of a source language and a sample of a target language, a first generation step of generating an annotated named-entity recognition model of the source language by applying Conditional Random Field sequence labeling to the annotated sample of the source language and obtaining an optimum weight for each annotated named entity of the source language, a calculation step of calculating similarity between the annotated sample of the source language and the sample of the target language, and a second generation step of generating a named-entity recognition model of the target language based on the annotated named-entity recognition model of the source language and the similarity.

A multilingual named-entity recognition program according to an aspect of the present application causes a computer to execute an acquisition step of acquiring an annotated sample of a source language and a sample of a target language, a first generation step of generating an annotated named-entity recognition model of the source language by applying Conditional Random Field sequence labeling to the annotated sample of the source language and obtaining an optimum weight for each annotated named entity of the source language, a calculation step of calculating similarity between the annotated sample of the source language and the sample of the target language, and a second generation step of generating a named-entity recognition model of the target language based on the annotated named-entity recognition model of the source language and the similarity.

In a multilingual named-entity recognition method according to an aspect of the present application, the first generation unit may generate the annotated named-entity recognition model of the source language by optimizing a class probability indicating a probability of a next or previous word belonging to another class and a word probability being a probability of a particular word appearing within the annotated sample of the source language based on a class of the particular word for each annotated named entity of the source language.

In a multilingual named-entity recognition method according to an aspect of the present application, the calculation unit may calculate the similarity by using at least one of Brown clustering mapping and gazetteer expansion.

In a multilingual named-entity recognition method according to an aspect of the present application, the calculation unit may calculate the similarity by the Brown clustering mapping using at least one of exact match string similarity, edit distance string similarity, binary synset similarity, and frequency-weighted synset similarity.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions. While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A multilingual named-entity recognition system comprising:
    at least one memory operable to store program code; and
    at least one processor operable to read the program code and operate as instructed by the program code, the program code including:
    acquisition code configured to cause the at least one processor to acquire an annotated sample of text of a source language and a sample of text of a target language;
    first generation code configured to cause the at least one processor to generate an annotated named-entity recognition model of the source language by applying Conditional Random Field sequence labeling to the annotated sample of text of the source language, identifying one or more text strings as named entities within the annotated sample of text of the source language, and obtaining an optimum weight for each named entity identified from the annotated sample of text of the source language, wherein each named entity includes at least one word that identifies a characteristic of an object, wherein the annotated named-entity recognition model of the source language is configured to recognize text of the source language;
    calculation code configured to cause the at least one processor to calculate textual string similarity between the annotated sample of text of the source language and the sample of text of the target language by using at least Brown clustering mapping including refining binary synset similarity by adding a frequency-weighted component; and
    second generation code configured to cause the at least one processor to generate a named-entity recognition model that recognizes text strings of the target language based on the annotated named-entity recognition model of the source language and the calculated textual string similarity.

2. The multilingual named-entity recognition system according to claim 1, wherein
    the first generation code is configured to cause the at least one processor to generate the annotated named-entity recognition model of the source language by optimizing a class probability indicating a probability of a next or previous word belonging to another class and a word probability being a probability of a particular word appearing within the annotated sample of text of the source language based on a class of the particular word for each annotated named entity of the source language.

3. The multilingual named-entity recognition system according to claim 1, wherein the optimum weight includes a class probability and a word probability, wherein the word probability is a probability of a particular word appearing within the annotated sample of text of the source language based on its class, and the class probability is a probability of a next word in sequence belonging to a particular class.

4. A multilingual named-entity recognition method executed by a computer, comprising:
   acquiring an annotated sample of text of a source language and a sample of text of a target language;
   generating an annotated named-entity recognition model of the source language by applying Conditional Random Field sequence labeling to the annotated sample of text of the source language, identifying one or more text strings as named entities within the annotated sample of text of the source language, and obtaining an optimum weight for each named entity identified from the annotated sample of text of the source language, wherein each named entity includes at least one word that identifies a characteristic of an object, wherein the annotated named-entity recognition model of the source language is configured to recognize text of the source language;
   calculating textual string similarity between the annotated sample of text of the source language and the sample of text of the target language by using Brown clustering mapping including refining binary synset similarity by adding a frequency-weighted component; and
   generating a named-entity recognition model that recognizes text strings of the target language based on the annotated named-entity recognition model of the source language and the calculated textual string similarity.

5. A non-transitory recording medium storing a multilingual named-entity recognition program causing a computer to:
   acquire an annotated sample of text of a source language and a sample of text of a target language;
   generate an annotated named-entity recognition model of the source language by applying Conditional Random Field sequence labeling to the annotated sample of text of the source language, identifying one or more text strings as named entities within the annotated sample of text of the source language, and obtaining an optimum weight for each named entity identified from the annotated sample of text of the source language, wherein each named entity includes at least one word that identifies a characteristic of an object, wherein the annotated named-entity recognition model of the source language is configured to recognize text of the source language;
   calculate textual string similarity between the annotated sample of text of the source language and the sample of text of the target language by using at least Brown clustering mapping including refining binary synset similarity by adding a frequency-weighted component; and
   generate a named-entity recognition model that recognizes text strings of the target language based on the annotated named-entity recognition model of the source language and the calculated textual string similarity.

* * * * *